Sept. 2, 1924.
F. E. FIELD
1,506,895
ELECTRICAL MEASURING METHOD AND MEANS
Filed April 15, 1922
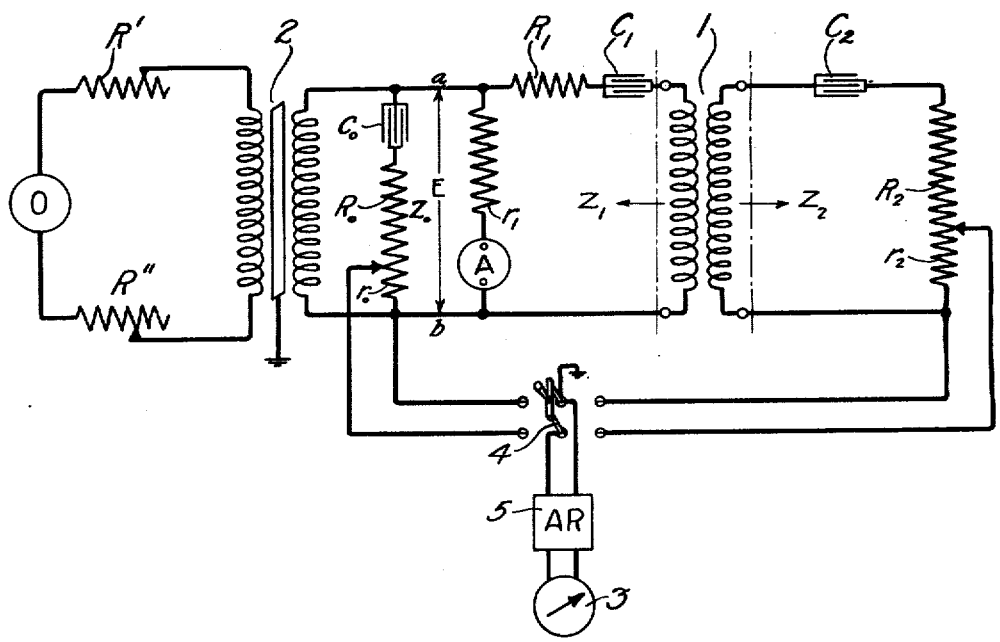
Inventor:
Frank E. Field.
by Paul A. Palmer
Att'y Patented Sept. 2, 1924.

1,506,895

UNITED STATES PATENT OFFICE.

FRANK E. FIELD, OF SOMERVILLE, NEW JERSEY, ASSIGNOR TO WESTERN ELECTRIC COMPANY, INCORPORATED, OF NEW YORK, N. Y., A CORPORATION OF NEW YORK.

ELECTRICAL MEASURING METHOD AND MEANS.

Application filed April 15, 1922. Serial No. 552,879.

*To all whom it may concern:*

Be it known that I, FRANK E. FIELD, a citizen of the United States, residing at Somerville, in the county of Somerset, State of New Jersey, have invented certain new and useful Improvements in Electrical Measuring Methods and Means, of which the following is a full, clear, concise, and exact description.

This invention relates to the art of electrical measurement and particularly to a method of and means for determining the transmission loss of electrical apparatus to be connected between circuits of different impedances. The invention is set forth hereinafter with especial reference to its application to the determination of the transmission loss of telephone repeating coils or other transformers, but is applicable to electrical apparatus in general.

The invention contemplates the testing of apparatus under conditions simulating actual service conditions for the apparatus; to eliminate errors due to variation of supply voltage; to avoid difficulty and error in taking readings due to external disturbances during the taking of the readings; to obviate any necessity for calibrating amplifiers employed in making the measurements; and to avoid changing the impedance of the test circuit during the test.

In accordance with the invention, as applied to the measurement of the transmission loss of a repeating coil or transformer, the coil is placed in a circuit such that service conditions for the coil are simulated. An alternating current is then impressed on the coil, and the transmission loss of the coil is determined from the ratio of the value of the resulting secondary current to the value that the secondary current would have if the transformer were perfect—that is, had infinite mutual inductance, zero direct current resistance, zero leakage, and an impedance ratio equal to the ratio of the impedances of the circuits coupled by the transformer. Thus, the "transmission loss" of the transformer here indicates the difference between the transmission gain which would result from employing a perfect transformer instead of no transformer and the transmission gain which results from employing the actual transformer instead of no transformer. In other words, the transmission loss of the actual transformer is here considered as represented by the gain in the transmission efficiency of the circuit which would result from replacing the actual transformer by a perfect transformer.

The drawing illustrates the invention applied to the measurement of the transmission loss of a repeating coil.

Energy is supplied to the low voltage winding of the repeating coil 1 from an oscillator O or other suitable source, preferably through a transformer 2, which may be a shielded transformer, as indicated on the drawing in order to prevent interference from external sources. R' and R" are resistances for regulating the voltage applied to the transformer 2.

During all measurements, when looking from the coil 1 in either direction, one should see impedance values corresponding to the particular service conditions for which the transmission equivalent of the coil is to be determined. Therefore, the high voltage side of coil 1 is connected to an impedance $Z_2$, consisting of the proper non-inductive resistance $R_2$ and $r_2$ and condenser or other appropriate reactance element $C_2$ to simulate service conditions as regards the value and phase angle of the impedance connected to the secondary or high voltage side of coil 1. Similarly, an impedance $Z_1$, consisting of non-inductive resistance $R_1$ and condenser or other proper reactance element $C_1$, is connected in circuit with the low side of coil 1 to simulate service conditions, a non-inductive resistance $r_1$ being connected across $R_1$, $C_1$ and the primary of the coil and made of negligibly small impedance in comparison to that of $R_1$ and $C_1$. Thus $$Z_1 = R_1 - \frac{1}{jC_1\omega},$$

and is equal to the impedance into which the low side of the coil 1 is desired to work in service. Also, $$Z_2 = R_2 + r_2 - \frac{1}{jC_2\omega},$$

and is equal to the impedance into which the high side of coil is desired to work in service.

An impedance $Z_0$, consisting of non-inductive resistances $R_0$ and $r_0$ and condenser or other desirable reactance element $C_0$, is connected in parallel with $r_1$, $Z_0$ being made equal to $$Z_1 + \frac{Z_2}{K},$$

where K is the impedance ratio of the transformer, that is, $Z_0$ being made equal to the impedance which the circuit to the right of $r_1$ would present if the transformer were perfect. A thermocouple or the like is placed in series in $r_1$, in order to measure the current through $r_1$ and thus facilitate the adjustment of the current through $Z_0$ to a desired value. The resistance of the thermocouple is included in $r_1$.

Means is provided for balancing or comparing the voltage drop across $r_2$ and the voltage drop across $r_0$. For instance, an indicating galvanometer 3, or the like, and a double throw switch 4, or the like, may be used to measure the voltage drop across $r_2$ and the voltage drop across $r_0$ in quick succession. Preferably a three stage vacuum tube amplifier or the like is interposed between the switch 4 and the instrument 3 and the vacuum tube rectifier or other appropriate means is connected to the amplifier so that a direct current micro-ammeter may be used as the indicating galvanometer. The amplifier and rectifier are designated 5 in the drawing.

In operation, $r_2$ is set at some convenient value and $r_0$ is varied until the voltage drop across $r_0$ is equal to the voltage drop across $r_2$, these drops being compared by quickly throwing the switch 4 from one of these resistances to the other. At all times during this balancing of the circuit Z and $Z_0$ must be kept at the proper predetermined values. When the same reading is obtained on the micro-ammeter for the voltage drop across $r_0$ as is obtained for the voltage drop across $r_2$ the desired current ratio, from which the transmission equivalent of the transformer 1 may be obtained in a manner indicated hereinafter, is equal to the ratio $\frac{r_0}{r_2}$ multiplied by the voltage ratio (high voltage over low voltage) of the transformer. This may be proved as follows:

Let $I_0$, $I_1$ and $I_2$ be the currents in $Z_0$, $Z_1$ and $Z_2$, respectively. Let E be the voltage between points $a$ and $b$, as indicated in the drawing.

To the left of $a\ b$ we have $$E = Z_0 I_0 \quad (1)$$

When the circuit is balanced $r_0 I_0 = r_2 I_2$ from which $$I_0 = \frac{r_2}{r_0} I_2 \quad (2)$$

Substituting (2) in (1), we have $$E = Z_0 \frac{r_2}{r_0} I_2 \quad (3)$$

Let $$K = \frac{Z_2}{Z_1},$$

and consider that the coil under test is replaced by a perfect coil. Then $\frac{1}{\sqrt{K}}$ will be the current transformation ratio of the perfect coil. Let I be the current through $Z_2$ when the coil is replaced by the perfect transformer. Then the corresponding current through the primary winding of the transformer will be $I\sqrt{K}$.

Consider the circuit to the right of $a\ b$ (supposing the coil to be replaced by the perfect transformer), and let E' then designate the voltage across $a\ b$. Then $$E' = I\sqrt{K}\left(Z_1 + \frac{Z_2}{K}\right) \quad (4)$$

Since, as is indicated above, the impedance of $r_1$ is low, the value of E' would not be appreciably different from the value of E, and therefore, we may equate (4) and (3), giving $$I\sqrt{K}\left(Z_1 + \frac{Z_2}{K}\right) = Z_0 \frac{r_2}{r_0} I_2 \quad (5)$$

$$\frac{I_2}{I} = \frac{r_0}{r_2}\left(Z_1 + \frac{Z_2}{K}\right)\frac{\sqrt{K}}{Z_0} \quad (6)$$

In equation (6) $\frac{I_2}{I}$ is the current ratio desired for determining the transmission equivalent of the coil and $\frac{r_0}{r_2}$ is the ratio of the resistances the drops across which are balanced to obtain a reading. The ratio $\frac{r_0}{r_2}$ obtaining under the balance condition multiplied by $\sqrt{K}$ will equal $\frac{I_2}{I}$ if $$\left(Z_1 + \frac{Z_2}{K}\right)\frac{1}{Z_0}$$

is made equal to unity, that is if $$Z_0 = \left(Z_1 + \frac{Z_2}{K}\right);$$

but $Z_0$ actually does have this value, as was pointed out above. Therefore, $$\frac{I_2}{I} = \left(\frac{r_0}{r_2}\right)\sqrt{K}$$

This current ratio, which we may designate R, is a measure of the transmission loss of the transformer, and may be expressed in terms of the number of units of length in such a sectional length of an infinitely long, standard, 19 gauge cable as would cause this ratio R to exist between current flowing from the section and current flowing into the section, the current in the cable being of any chosen frequency. As explained on pages 848 and 862, vol. 2 of Sir Richard Glazebrook's "Dictionary of Applied Physics," MacMillan Company, New York, 1922, the relation expressing the ratio R in terms of units of length of standard cable is;

$$\text{units of length of standard cable} = \frac{2.3026 \log_{10}\left(\frac{1}{R}\right)}{a}$$

where $a$ is the attenuation constant per unit of length of standard cable at the chosen frequency. The value of $a$ is proportional to the square of the frequency. Usually, the frequency chosen is 796 cycles per second, and the unit of length chosen is a mile. The value of $a$ is then .109, and the relation expressing R in terms of units of length of standard cables becomes:

$$\text{miles of standard cable} = \frac{2.3026 \log_{10}\left(\frac{1}{R}\right)}{.109} = 21.12 \log_{10}\left(\frac{1}{R}\right).$$

The "miles of standard cables," given by this equation, is designated the "transmission loss" (or "loss, in miles of standard cable, at 796 cycles") corresponding to the ratio R. This loss is the transmission loss of the transformer in the desired terms (it being understood that, as noted above, the transmission loss in the circuit due to employment of the actual transformer instead of a perfect transformer is regarded as the transmission loss of the actual transformer.) Of course, from the current ratio R determined as described above, the transmission loss of the transformer may, if desired, be obtained in terms other than miles of standard cable.

$R_0$, $r_0$, and $R_2$, $r_2$ may be graduated in terms of resistance, of course. Or, since $$\frac{I_2}{I} = r_0 \times \frac{\sqrt{K}}{r_2} = r_0 k$$

where $k$ is a constant for a given setting of $r_2$ for a given transformer impedance ratio, $R_0$, $r_0$ can be so graduated that under these conditions the reading of $r_0$ will give the value of the ratio $\frac{I_2}{I}$ directly. Such graduation may be very desirable where a number of transformers having the same impedance ratio are to be tested. Since the attenuation coefficient $a$ is constant for a fixed frequency, the impedance $R_0$, $r_0$ can also be so graduated that for a fixed frequency the reading of $r_0$ will give the loss in the transformer directly in terms of the number of miles of standard cable which would have the same loss.

Although it has been stated above that $$Z_0 = Z_1 + \frac{Z_2}{K},$$

it may be seen from equation (6) above that $Z_0$ can, instead, be made equal to $$\left(Z_1 + \frac{Z_2}{K}\right)\sqrt{K},$$

in which case $\frac{I_2}{I}$ will be equal to $\frac{r_0}{r_2}$ instead of to $$\frac{r_0}{r_2}\sqrt{K},$$

and the current through $Z_0$ will be equal to I instead of to I $\sqrt{K}$.

The current ratios which have been obtained by means of the circuit of this invention in the determination of the transmission equivalents of various apparatus agree closely with the calculated values of these ratios. For instance, in measuring the transmission loss of several different receiver shunts each consisting of a series and a shunt resistance, the readings obtained checked the calculated values within less than .5% for losses varying from 1 to 30 miles.

With the circuit herein described any ordinary change in voltage of the oscillator will not affect the balance obtained, since both of the voltage drops $r_2 I_2$ and $r_0 I_0$ vary with the supply voltage and these voltage drops are measured substantially simultaneously.

In practicing this invention the amplifier need not be calibrated since it is only used as an element of an indicator and not as a measuring device.

Since in the circuit here disclosed no highly sensitive alternating current measuring device is required, and the direct current meter employed is fed through an amplifier-rectifier device, which does not have to be calibrated, any necessity for careful calibration and adjustment of a current-measuring device is obviated, and trouble due to external disturbances during the taking of readings is avoided.

In the system disclosed herein the impedance of the circuit is not appreciably changed during the test, for the input impedance of the amplifier is so high that its shunting effect is negligible.

In accordance with this invention when measurements are taken on a repeating coil or transformer, the circuit impedances may be made to correspond to the impedance ratio of the coil. It is desirable to measure the efficiency of the coil under the condition that the circuit impedance ratio and the impedance ratio of the coil are equal, for the reason that this is the condition for best results, or highest current output from the coil.

What is claimed is:

1. The method of determining the transmission loss of electrical apparatus to be connected between circuits of different impedances, which comprises supplying input current to the apparatus to produce output current therefrom, producing a third current of a value different from said input current and bearing a predetermined relation to the value that said output current would have if the transmission equivalent of the apparatus were zero, and physically comparing the values of said output current and said third current.

2. The method of determining the transmission loss of a transformer which comprises producing output current therefrom, producing a current of a value bearing a predetermined relation to the value that said output current would have if the transformer were perfect, and physically comparing the values of said first and second mentioned currents.

3. The method of determining the transmission loss of a transformer which comprises producing an output current therefrom by applying an electromotive force to said transformer under conditions simulating its service conditions, producing a voltage drop from said output current, producing another current from said electromotive force, producing a voltage drop from said other current under predetermined conditions such that when said drops are equal the ratio of the quotient of one of said drops divided by the current producing it to the quotient of the other of said drops divided by the current producing it bears a predetermined relation to the ratio of the value of said output current to the value that the output current would have were the transmission equivalent of the transformer zero, and physically comparing said drops and adjusting them to the same value.

4. In combination, a transformer, means for producing an input current to and an output current from said transformer, means for producing a third current of a value different from said input current and bearing a known simple relation to the value that said output current would have if the transformer were a perfect transformer and means for physically comparing said third current and said output current.

5. In combination, a source of electromotive force, a transformer, impedance elements, and means for obtaining two equal voltage drops, one from one of said impedance elements and one from another of said impedance elements and for determining the relative values of the impedances across which said drops occur, said source, said transformer, and all of said impedance elements being so proportioned and arranged that the ratio of said impedance values bears a known simple relation to the ratio of the value of the output current from said transformer to the value that the output current would have were the transformer a perfect transformer.

6. In combination, a circuit comprising a transformer having an input winding and an output winding, an impedance connected to said output winding, and an impedance connected to said input winding, a source of voltage connected across the second mentioned impedance and said input winding, an impedance connected across said source, means for obtaining a voltage drop across at least a part of said first mentioned impedance and for obtaining an equal voltage drop across at least a part of said third mentioned impedance, said third mentioned impedance having a value such that the impedance ratio of said parts corresponding to said drops bears a known simple relation to the ratio of the value of the current in said first mentioned impedance to the value said current would have were said transformer a perfect transformer.

In witness whereof, I hereunto subscribe my name this 13th day of April, A. D. 1922.

FRANK E. FIELD.